United States Patent
Wang et al.

(10) Patent No.: US 10,957,047 B2
(45) Date of Patent: Mar. 23, 2021

(54) IMAGE PROCESSING DEVICE AND IMAGE PROCESSING METHOD

(71) Applicant: Panasonic Intellectual Property Management Co., Ltd., Osaka (JP)

(72) Inventors: Qinhe Wang, Kanagawa (JP); Ryoji Ogino, Kanagawa (JP); Kenji Tabei, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1 day.

(21) Appl. No.: 16/477,724

(22) PCT Filed: Nov. 8, 2017

(86) PCT No.: PCT/JP2017/040175
§ 371 (c)(1),
(2) Date: Jul. 12, 2019

(87) PCT Pub. No.: WO2018/150652
PCT Pub. Date: Aug. 23, 2018

(65) Prior Publication Data
US 2019/0362499 A1   Nov. 28, 2019

(30) Foreign Application Priority Data

Feb. 15, 2017   (JP) .............................. JP2017-025733

(51) Int. Cl.
*G06K 9/42*   (2006.01)
*G06T 7/174*   (2017.01)
(Continued)

(52) U.S. Cl.
CPC ................ *G06T 7/174* (2017.01); *G06T 5/50* (2013.01); *G06T 7/97* (2017.01)

(58) Field of Classification Search
CPC . G06T 5/50; G06T 2207/10024; G06T 5/003; G06T 5/006; G06T 5/002;
(Continued)

(56) References Cited

U.S. PATENT DOCUMENTS 6,215,914 B1   4/2001   Nakamura et al.
10,417,743 B2 *   9/2019   Furuki ...................... G06T 7/70
(Continued)

FOREIGN PATENT DOCUMENTS

JP   11-102430   4/1999
JP   2004-139219   5/2004
(Continued)

OTHER PUBLICATIONS

International Search Report issued in International Pat. Appl. No. PCT/JP2017/040175, dated Feb. 13, 2018.
(Continued)

*Primary Examiner* — Charlotte M Baker
(74) *Attorney, Agent, or Firm* — Greenblum & Bernstein, P.L.C.

(57) ABSTRACT

An image processing device for synthesizing a plurality of mutually adjacent and partially overlapping pieces of image data, includes a boundary portion selection unit which, from boundary portions of adjacent image data, selects the boundary portion for calculating an image correction value, a correction value calculator which calculates the image correction value of the boundary portion selected by the boundary portion selection unit, and an image correction unit which, in the boundary portion selected by the boundary portion selection unit, performs image correction of the boundary portion using the image correction value calculated by the correction value calculator, and which, in the boundary portion that has not been selected by the boundary portion selection unit, performs image correction using the image correction value calculated in the past.

11 Claims, 8 Drawing Sheets

(51) Int. Cl.
*G06T 7/00* (2017.01)
*G06T 5/50* (2006.01)

(58) Field of Classification Search
CPC . G06T 2207/20172; G06T 7/174; G06T 7/97;
G06T 2207/10016; G06T 5/008; G06T
3/4038; H04N 5/23238; H04N 5/23232;
H04N 5/232
USPC ..... 382/256, 104, 275, 232; 348/222.1, 568,
348/14.13
See application file for complete search history.

(56) References Cited

U.S. PATENT DOCUMENTS

| | | | |
|---|---|---|---|
| 10,536,633 B2 * | 1/2020 | Kuwada | H04N 5/23238 |
| 2004/0228544 A1 | 11/2004 | Endo et al. | |
| 2016/0007611 A1 | 1/2016 | Sirinyan et al. | |
| 2016/0088287 A1 | 3/2016 | Sadi et al. | |
| 2016/0234437 A1 | 8/2016 | Kuwada et al. | |
| 2016/0234438 A1 | 8/2016 | Satoh | |
| 2016/0286138 A1 | 9/2016 | Kim | |

FOREIGN PATENT DOCUMENTS

| | | |
|---|---|---|
| JP | 2004-185132 | 7/2004 |
| JP | 2008-017197 | 1/2008 |
| JP | 2013-029995 | 2/2013 |
| JP | 2016-146543 | 8/2016 |
| JP | 2016-149736 | 8/2016 |

OTHER PUBLICATIONS

The Extended European Search Report dated Jan. 17, 2020 for European Patent Application No. 17896981.2.

* cited by examiner

FIG. 4B FRAME n

FIG. 4C FRAME n + 1

FIG. 4D FRAME n + 2

FIG. 4E FRAME n + 3

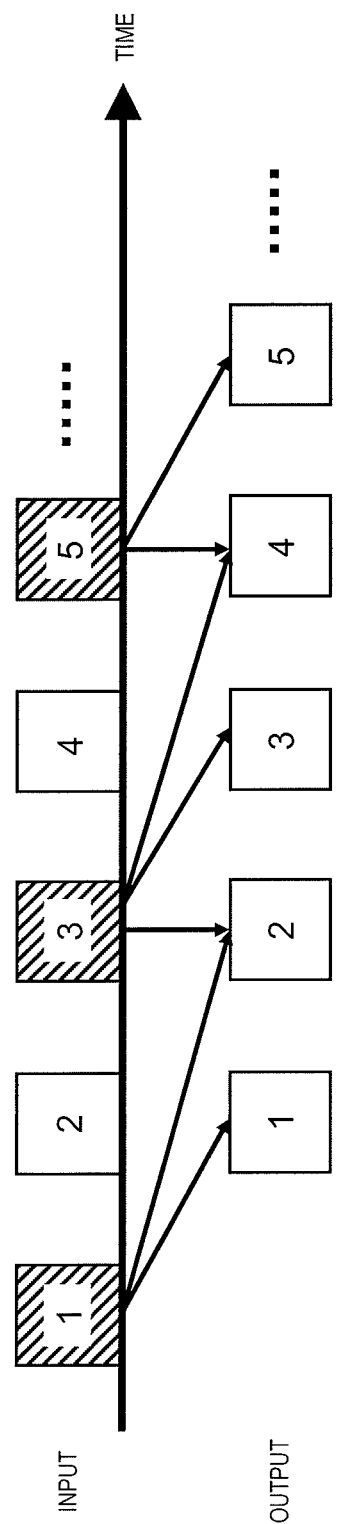

IMAGE PROCESSING DEVICE AND IMAGE PROCESSING METHOD

TECHNICAL FIELD

The present disclosure relates to an image processing device that synthesizes a plurality of mutually adjacent and partially overlapping pieces of image data, and an image processing method of the image processing device.

BACKGROUND ART

In PTL 1, an imaging system that connects images from a plurality of cameras and displays the images in a circulation is disclosed. In this imaging system, images are corrected so that discontinuities are not noticeable at all boundary portions.

CITATION LIST

Patent Literature

PTL 1: Japanese Patent Unexamined Publication No. 2013-29995

SUMMARY OF THE INVENTION

However, there is a problem that image processing becomes heavy when calculating a correction value for making discontinuity of an image unnoticeable at all boundary portions. Particularly, when a target image is a moving image, if image processing is heavy, real time processing becomes difficult.

An object of the present disclosure is to provide a technique for achieving high-speed image processing while maintaining image quality.

An image processing device according to the present disclosure is an image processing device for synthesizing a plurality of mutually adjacent and partially overlapping pieces of image data, the image processing device including a boundary portion selection unit which, from boundary portions of adjacent image data, selects the boundary portion for calculating an image correction value, a correction value calculator which calculates the image correction value of the boundary portion selected by the boundary portion selection unit, and an image correction unit which, in the boundary portion selected by the boundary portion selection unit, performs image correction of the boundary portion using the image correction value calculated by the correction value calculator, and which, in the boundary portion that has not been selected by the boundary portion selection unit, performs image correction using the image correction value calculated in the past.

According to the present disclosure, it is possible to achieve high-speed image processing while maintaining image quality.

BRIEF DESCRIPTION OF DRAWINGS

FIG. 4B is a diagram for explaining a processing example of the boundary portion selection unit and the correction value calculator.

FIG. 4C is a diagram for explaining a processing example of the boundary portion selection unit and the correction value calculator.

FIG. 4D is a diagram for explaining a processing example of the boundary portion selection unit and the correction value calculator.

FIG. 4E is a diagram for explaining a processing example of the boundary portion selection unit and the correction value calculator.

FIG. 8 is a diagram illustrating an example of estimating an image correction value using past and future image correction values.

DESCRIPTION OF EMBODIMENT

Hereinafter, embodiments of the present disclosure will be described with reference to the drawings.

Figure 1:
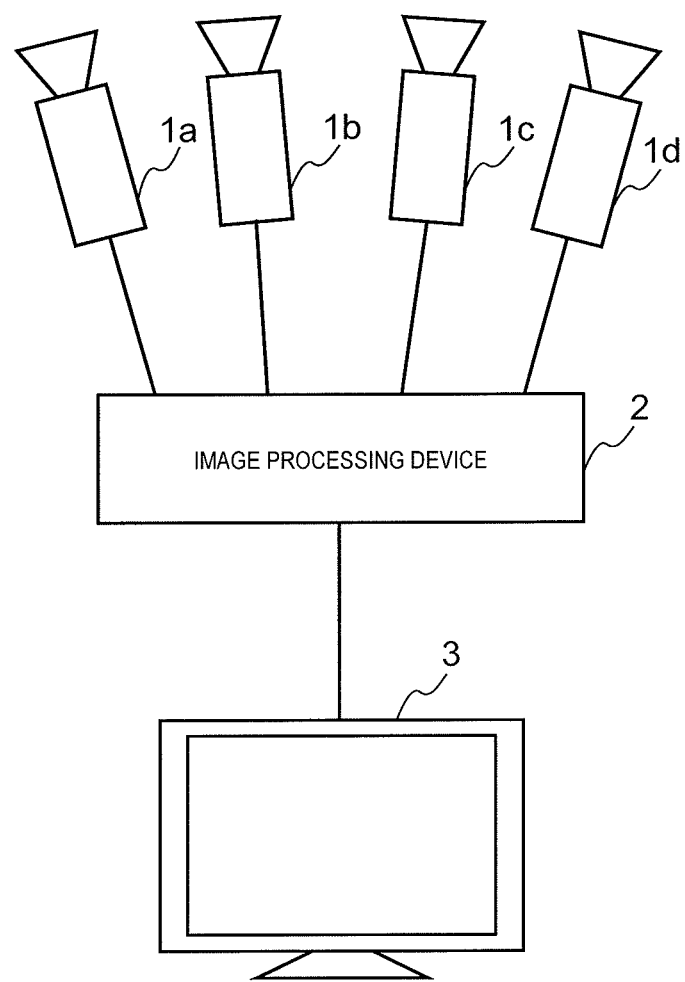
FIG. 1 is a diagram illustrating an example of an image processing system using an image processing device according to an embodiment of the present disclosure.

FIG. 1 is a diagram illustrating an example of an image processing system using an image processing device according to an embodiment of the present disclosure. As illustrated in FIG. 1, the image processing system includes photographing cameras 1a to 1d, image processing device 2, and display device 3.

Photographing cameras 1a to 1d are arranged such that photographing areas partially overlap with each other between two adjacent photographing cameras. Photographing cameras 1a to 1d output image data of photographed photographing areas to image processing device 2.

Image processing device 2 stitches the image data output from each of photographing cameras 1a to 1d for each frame to generate one piece of image data (panoramic image data). Image processing device 2 outputs the generated panoramic image data to display device 3.

Display device 3 displays the panoramic image data output from image processing device 2.

That is, the image processing system of FIG. 1 panorama-synthesizes the image data of the photographing area photographed by each of photographing cameras 1a to 1d and displays the image data on display device 3.

In FIG. 1, the number of photographing cameras 1a to 1d is four, but is not limited thereto. For example, the number of photographing cameras 1a to 1d may be three, or may be five or more. In the case of synthesizing the image data of each photographing camera to generate an all-round video image, the number of photographing cameras 1a to 1d may be two. That is, there is no limitation on the number of cameras as long as a configuration in which a plurality of boundary portions exist in the entire system is adopted.

Figure 2:
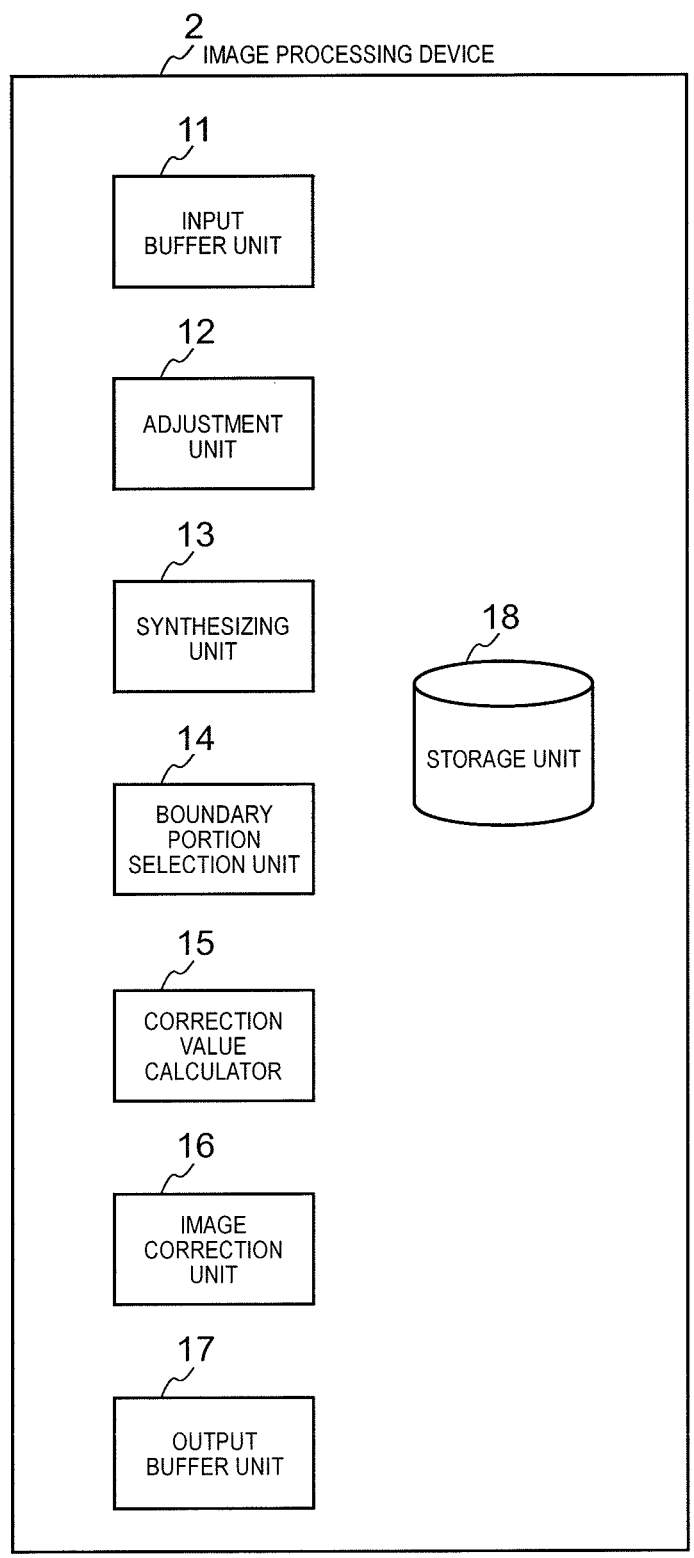
FIG. 2 is a diagram illustrating a functional block configuration example of the image processing device.

FIG. 2 is a diagram illustrating a functional block configuration example of image processing device 2. As illustrated in FIG. 2, image processing device 2 includes input buffer unit 11, adjustment unit 12, synthesizing unit 13, boundary portion selection unit 14, correction value calculator 15, image correction unit 16, output buffer unit 17, and storage unit 18.

Image data output from photographing cameras 1a to 1d is input to input buffer unit 11. Input buffer unit 11 temporarily stores the input image data.

Adjustment unit 12 reads the image data temporarily stored in input buffer unit 11 and performs image adjustment of the read image data. For example, adjustment unit 12 performs adjustment for panoramic synthesis of synthesizing unit 13, which will be described later, based on information such as spatial arrangement and optical characteristics of photographing cameras 1a to 1d. More specifically, adjustment unit 12 adjusts a position, a shape, density, and the like of the image data.

An arithmetic-calculation amount of adjustment unit 12 is smaller than the arithmetic-calculation amount of correction value calculator 15 which will be described later. In a case where there is a need to perform image adjustment on the entire region of the image data photographed by each of photographing cameras and read from input buffer unit 11, adjustment unit 12 performs the image adjustment on the entire region of the image data.

Synthesizing unit 13 performs stitching (panorama synthesis) on the image data adjusted by adjustment unit 12. When stitching the image data, synthesizing unit 13 performs stitching such that a part of adjacent image data is overlapped. For example, synthesizing unit 13 superimposes image areas corresponding to overlapping portions of the photographing areas in the image data of each of photographing cameras 1a to 1d arranged so that the photographing areas partially overlap, and stitches the image data. Hereinafter, adjacent overlapping portions of image data may be referred to as a boundary portion.

Boundary portion selection unit 14 selects a boundary portion for calculating the image correction value from the boundary portions (see dotted lines A11 to A13 in FIG. 4A) of the image data synthesized by synthesizing unit 13. A selection operation of the boundary portion of boundary portion selection unit 14 will be described in detail later.

Correction value calculator 15 calculates an image correction value of the boundary portion selected by boundary portion selection unit 14. For example, correction value calculator 15 extracts feature points in the boundary portion of adjacent image data, and associates the extracted feature points. Correction value calculator 15 then calculates a correction value such as the shape and/or density of a local region based on a positional relationship and/or density difference of a set of the feature points to which the association has been made.

That is, correction value calculator 15 calculates an image correction value of the boundary portion selected by boundary portion selection unit 14 so that the boundary portion selected by boundary portion selection unit 14 is smoothly displayed (for example, so that there are no discontinuities or the like and are displayed continuously). Correction value calculator 15 may calculate the correction value of the image data of the boundary portion and a portion around the boundary portion.

Here, synthesis and correction of image data will be described.

FIG. 3A to FIG. 3D are diagrams for explaining an example of synthesis and correction of image data. In FIG. 3A to FIG. 3D, in order to simplify description, an example of synthesis and correction of image data output from two photographing cameras 21a and 21b will be described.

Figure 3A:
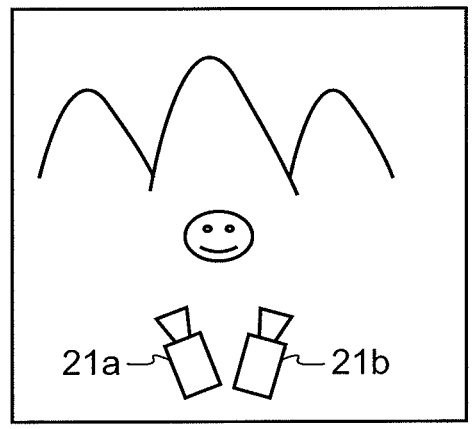
FIG. 3A is a diagram for explaining an example of synthesis and correction of image data.

FIG. 3A illustrates a photographing situation by two photographing cameras 21a and 21b. In the example of FIG. 3A, the two photographing cameras 21a and 21b photograph the person in the foreground and the mountain in the distant view at the same time.

Figure 3B:
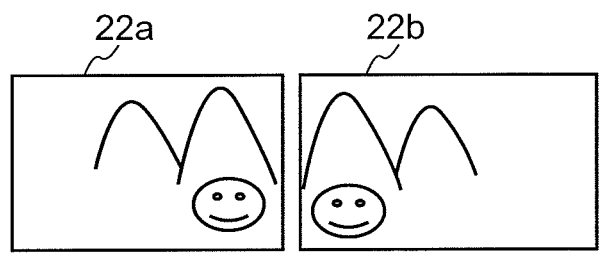
FIG. 3B is a diagram for explaining an example of synthesis and correction of image data.

FIG. 3B illustrates photographed images of two photographing cameras 21a and 21b. Photographed image 22a illustrated in FIG. 3B illustrates the photographed image of photographing camera 21a and photographed image 22b illustrates the photographed image of photographing camera 21b.

For example, image data of photographed images 22a and 22b illustrated in FIG. 3B is input to input buffer unit 11 illustrated in FIG. 2. Then, the image data of photographed images 22a and 22b input to input buffer unit 11 are read out by adjustment unit 12 and is subjected to image adjustment. The image data subjected to image adjustment by adjustment unit 12 is simply synthesized by synthesizing unit 13 illustrated in FIG. 2. That is, synthesizing unit 13 does not correct an image of the overlapping portion (boundary portion), but merely synthesizes two photographed images 22a and 22b so that both ends thereof partially overlap.

Figure 3C:
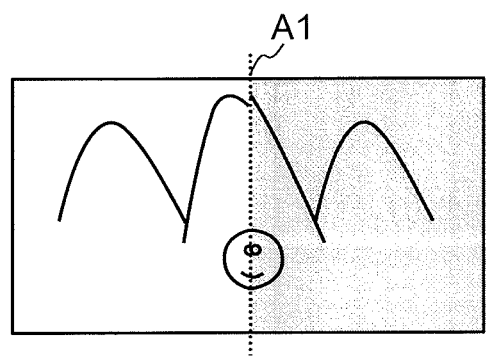
FIG. 3C is a diagram for explaining an example of synthesis and correction of image data.

FIG. 3C illustrates a synthesized image of the two photographed images 22a and 22b of FIG. 3B. In a case of simply synthesizing the image data of photographing cameras 21a and 21b, as illustrated by a dotted line A1 in FIG. 3C, a difference (discontinuity) may occur in the boundary portion between two photographed images 22a and 22b. For example, some of the persons in the near view disappear, and the mountains in the distant view are separated.

The difference in the boundary portion includes, for example, a parallax between a mountain in a distant view and a person in a near view, geometric distortion due to a camera lens, and the like. The difference in the boundary portion includes, for example, a difference in brightness due to an exposure difference between the two photographing cameras 21a and 21b, color unevenness, and the like.

Figure 3D:
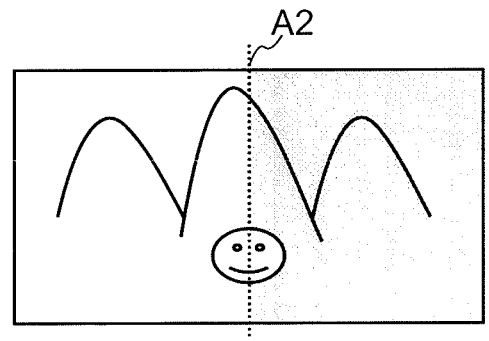
FIG. 3D is a diagram for explaining an example of synthesis and correction of image data.

FIG. 3D illustrates an image after correcting the boundary portion of the synthesized image of FIG. 3C. Correction value calculator 15 illustrated in FIG. 2 calculates the image correction value of the image data so that the boundary portion of the image synthesized by synthesizing unit 13 is smoothly displayed. The boundary portion between adjacent images is displayed smoothly as indicated by a dotted line A2 in FIG. 3D by the calculated image correction value.

As in the examples of FIGS. 3A to 3D, in the case of synthesizing the image data of the two photographing cameras 21a and 21b, there is one boundary portion. On the other hand, as in the example of FIG. 1, in the case of synthesizing the image data by the four photographing cameras 1a to 1d to generate a panoramic image, there are three boundary portions (see dotted lines A11 to A13 in FIG. 4A). When calculation of the image correction value is performed at the three boundary portions, processing of image processing device 2 (correction value calculator 15) becomes heavy. The processing of image processing device 2 becomes heavy as the number of boundary portions of image data increases. The number of boundary portions increases with the increase in the number of photographing cameras.

Accordingly, as described above, boundary portion selection unit 14 selects a boundary portion for calculating the image correction value. Then, correction value calculator 15 calculates the image correction value of the boundary portion selected by boundary portion selection unit 14.

Figure 4A:
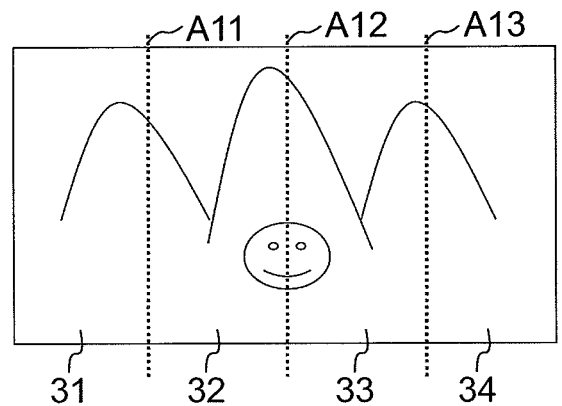
FIG. 4A is a diagram for explaining a processing example of a boundary portion selection unit and a correction value calculator.
Figure 4A:
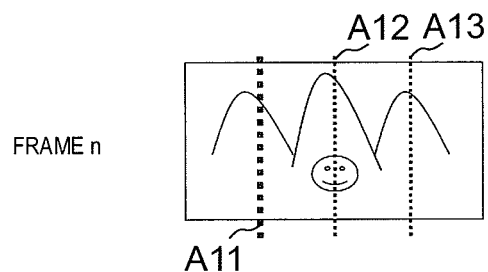
Figure 4A:
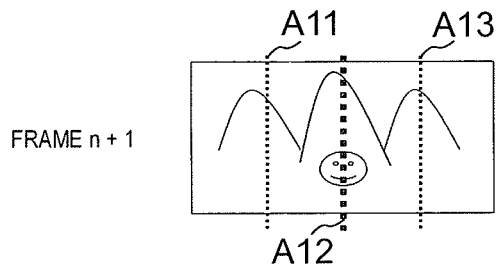
Figure 4A:
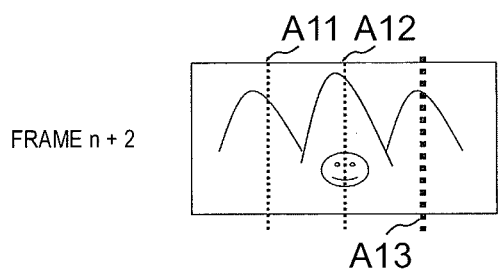
Figure 4A:
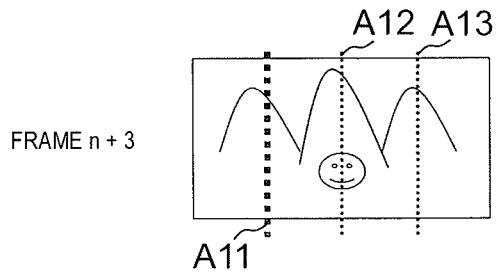

FIGS. 4A to 4E are diagrams for explaining processing examples of boundary portion selection unit 14 and correction value calculator 15. Photographed image 31 illustrated in FIG. 4A illustrates a photographed image of photographing camera 1a illustrated in FIG. 1. Photographed image 32 illustrates a photographed image of photographing camera 1b. Photographed image 33 illustrates a photographed image of photographing camera 1c. Photographed image 34 illustrates a photographed image of photographing camera 1d.

A dotted line A11 illustrated in FIG. 4A illustrates a boundary portion between two adjacent photographed images 31 and 32. A dotted line A12 indicates a boundary portion between two adjacent photographed images 32 and 33. A dotted line A13 indicates a boundary portion between two adjacent photographed images 33 and 34.

In FIG. 4B, photographed images in a frame n are illustrated. In frame n, boundary portion selection unit 14 selects the boundary portion indicated by dotted line A11 among the boundary portions indicated by dotted lines A11 to A13. With this configuration, correction value calculator 15 calculates the image correction value of the boundary portion indicated by dotted line A11.

In FIG. 4C, photographed images in a frame n+1 are illustrated. In frame n+1, boundary portion selection unit 14 selects a boundary portion indicated by dotted line A12 among the boundary portions indicated by dotted lines A11 to A13. With this configuration, correction value calculator 15 calculates the image correction value of the boundary portion indicated by dotted line A12.

In FIG. 4D, the photographed images in a frame n+2 are illustrated. In frame n+2, boundary portion selection unit 14 selects the boundary portion indicated by dotted line A13 among the boundary portions indicated by dotted lines A11 to A13. With this configuration, correction value calculator 15 calculates the image correction value of the boundary portion indicated by dotted line A13.

In FIG. 4E, photographed images in a frame n+3 are illustrated. In frame n+3, boundary portion selection unit 14 selects the boundary portion indicated by dotted line A11 among the boundary portions indicated by dotted lines A11 to A13. With this configuration, correction value calculator 15 calculates the image correction value of the boundary portion indicated by dotted line A11. Hereinafter, similarly, boundary portion selection unit 14 sequentially switches boundary portions to be selected for each frame.

As such, correction value calculation of the boundary portion to be calculated by correction value calculator 15 is thinned out by selection of the boundary portion of boundary portion selection unit 14. With this configuration, processing of image processing device 2 (correction value calculator 15) is reduced and the processing speed is increased.

An example of a boundary portion selection algorithm of boundary portion selection unit 14 will be described. For example, boundary portion selection unit 14 selects a boundary portion based on the following expression (1).

$$N_{border} \% P = N_{frame} \% P \quad (1)$$

Here, "%" indicates the remainder operation, and "$N_{border}$" indicates the number of the boundary portion. The boundary portions are numbered in ascending order from the left side, for example. For example, "1" is assigned to the boundary portion indicated by dotted line A11 in FIG. 4A, "2" is assigned to the boundary portion indicated by dotted line A12, and "3" is assigned to the boundary portion indicated by dotted line A13.

"$N_{frame}$" indicates a frame number during image processing. "P" is a parameter that is set below the total number of boundary portions. "P" is stored in storage unit 18 in advance, for example.

For example, in a case where "P=2" is stored in storage unit 18, boundary portion selection unit 14 alternately selects even numbered boundary portions and odd number boundary portions for each frame. For example, in a case where "P=boundary total number" is stored in storage unit 18, boundary portion selection unit 14 sequentially selects boundary portions one by one for each frame. In a case where "P=3" is stored in storage unit 18, boundary portion selection unit 14 sequentially selects the boundary portion as described in FIGS. 4B to 4E.

The value of parameter "P" is determined, for example, by magnitude of movement of a subject in a moving video image. For example, if the movement of the video image is large, the value of parameter "P" is decreased and the frequency of calculation of the image correction value is increased. The value of parameter "P" is determined, for example, by processing capability of the processor. For example, if processing capability of the processor is high, the value of parameter "P" is decreased and the frequency of calculation of the image correction value is increased. If there is much margin in the processing by the processor, the value of "P" may be decreased, and if the margin is small, the value of "P" may be increased. As an example of an index indicating processing capability of the processor, a clock frequency of the CPU or the like is conceivable. As an example of the index indicating the margin of processing, a CPU utilization rate or the like is conceivable. The value of parameter "P" may be set by the user or may be dynamically set by automatic video image analysis, for example.

As such, boundary portion selection unit 14 can select the boundary portion for calculating the image correction value from among the boundary portions of the adjacent image data based on the expression (1).

Return to the explanation of FIG. 2. Image correction unit 16 performs image correction of the boundary portion using the image correction value calculated by correction value calculator 15.

Here, in each frame, there are a boundary portion for which the image correction value is calculated and a boundary portion for which the image correction value is not calculated. For example, in frame n illustrated in FIG. 4B, the image correction value is calculated for the boundary portion indicated by dotted line A11, but the image correction value is not calculated for the boundary portion indicated by dotted lines A12 and A13. In frame n+1 illustrated in FIG. 4C, the image correction value is calculated for the boundary portion indicated by dotted line A12, but the image correction value is not calculated for the boundary portion indicated by dotted lines A11 and A13.

Accordingly, image correction unit 16 performs image correction on the boundary portion, for which the image correction value is not calculated, using the image correction value calculated in the past.

For example, in frame n+1 illustrated in FIG. 4C, image correction unit 16 performs image correction on the boundary portion indicated by dotted line A11 using the image correction value indicated by dotted line A11 calculated in the past frame n. Image correction unit 16 performs image correction on the boundary portion indicated by dotted line A13 using the image correction value calculated in past frame n−1 (not illustrated).

For example, in frame n+2 illustrated in FIG. 4D, image correction unit 16 performs image correction on the boundary portion indicated by dotted line A11 using the image correction value indicated by dotted line A11 calculated in the past frame n. Image correction unit 16 performs image correction on the boundary portion indicated by dotted line A12 using the image correction value indicated by dotted line A12 calculated in the past frame n+1.

As such, image correction unit 16 performs image correction on the boundary portion not selected by boundary portion selection unit 14 using the image correction value calculated in the past. In general, since the image correction value has little change over time, even if image correction is performed using the image correction value calculated in the near past, image quality hardly deteriorates.

Output buffer unit 17 temporarily stores the image data synthesized by synthesizing unit 13 and image-corrected by image correction unit 16. The image data temporarily stored in output buffer unit 17 is output to display device 3.

Storage unit 18 stores various setting data. For example, parameter "P" described above is stored in storage unit 18.

Figure 5:
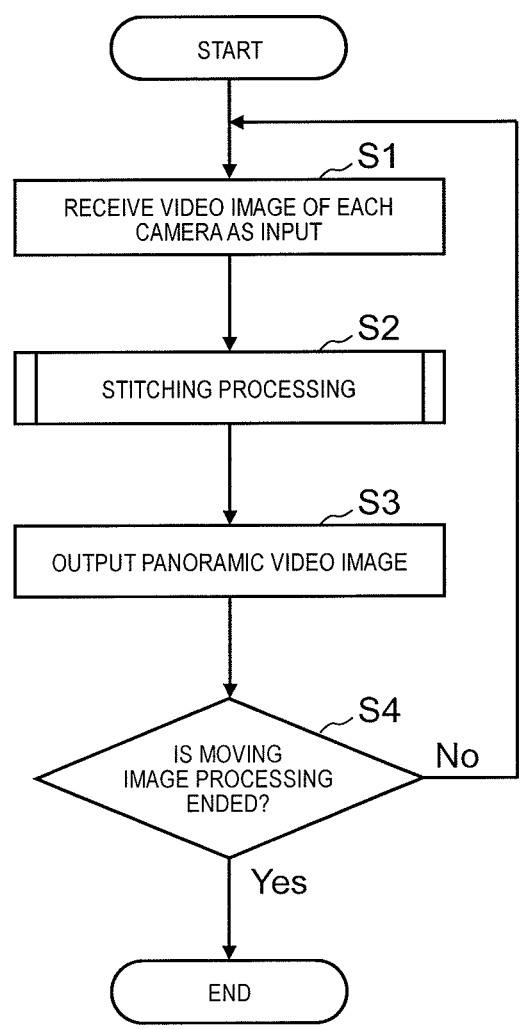
FIG. 5 is a flowchart illustrating an operation example of the image processing device.

FIG. 5 is a flowchart illustrating an operation example of image processing device 2. It is assumed that photographing cameras 1*a* to 1*d* photograph the photographing area and output the image data to image processing device 2.

First, input buffer unit 11 of image processing device 2 receives image data output from photographing cameras 1*a* to 1*d* (step S1) as an input. Input buffer unit 11 temporarily stores the input image data.

Next, image processing device 2 performs stitching processing on the image data temporarily stored in input buffer unit 11 in step S1 (step S2). The stitching processing of image processing device 2 will be described in detail below with reference to a flowchart.

Next, image processing device 2 outputs the image data (panoramic video image) that has been subjected to the stitching processing in step S2 to display device 3 (step S3).

Next, image processing device 2 determines whether or not to end moving image processing (step S4). When it is determined that the moving image processing is not to be ended ("No" in S4), image processing device 2 shifts the processing to step S1, and when it is determined that the moving image processing is to be ended ("Yes" in S4), the processing of the flowchart is ended. For example, in a case where an end operation of moving image processing is received from the user, image processing device 2 ends the moving image processing.

Figure 6:
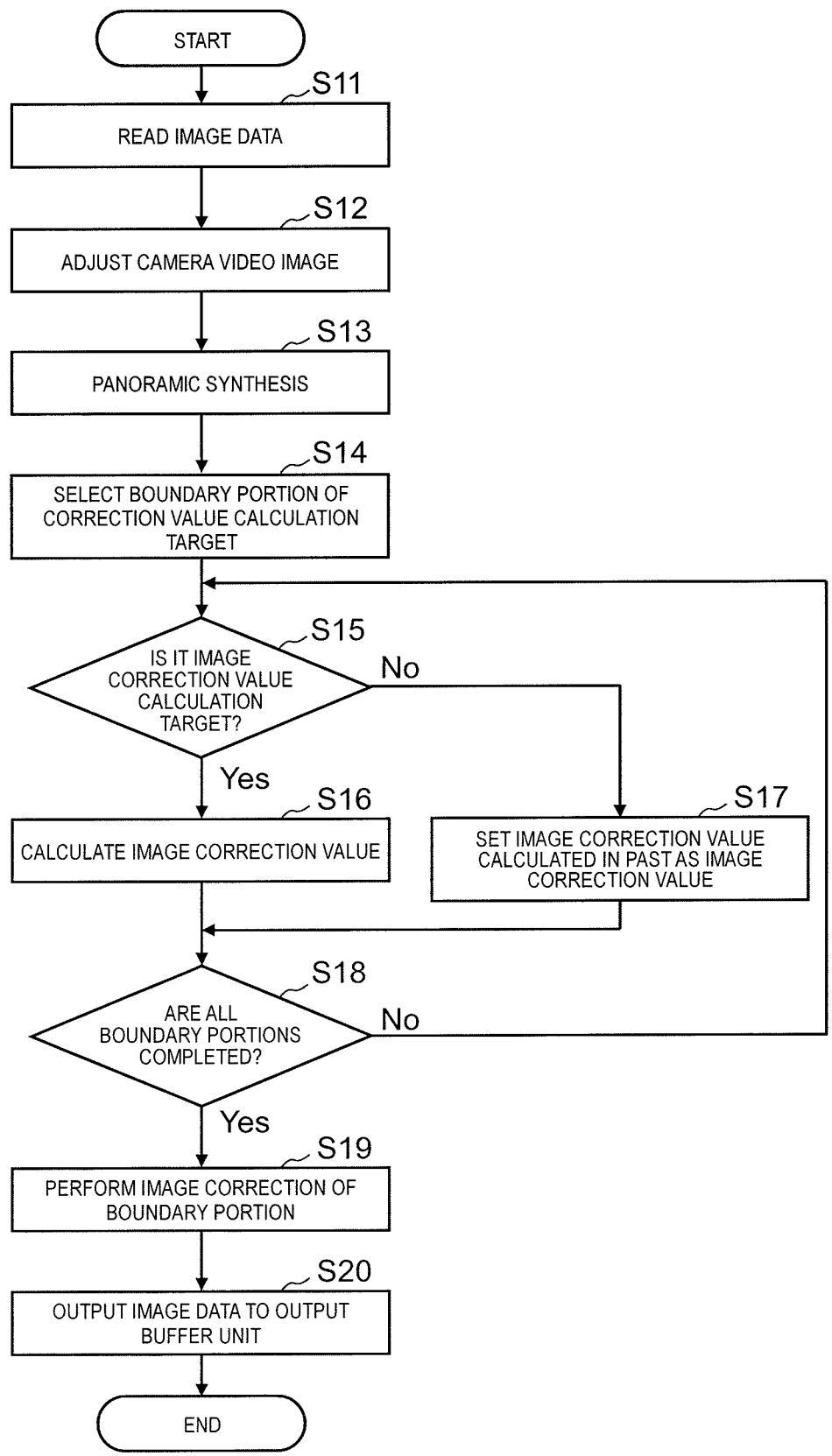
FIG. 6 is a flowchart illustrating a detailed processing example of stitching processing.

FIG. 6 is a flowchart illustrating a detailed processing example of the stitching processing. The flowchart of FIG. 6 illustrates a detailed processing example of step S2 of the flowchart of FIG. 5. Image processing device 2 executes processing of the flowchart illustrated in FIG. 6, for example, for each frame period of the image.

First, adjustment unit 12 reads the image data of photographing cameras 1*a* to 1*d* temporarily stored in input buffer unit 11 (step S11).

Next, adjustment unit 12 performs image adjustment of the image data read in step S11 (step S12). For example, adjustment unit 12 performs adjustment for panoramic synthesis of image data based on information such as spatial arrangement and optical characteristics of photographing cameras 1*a* to 1*d*.

Next, synthesizing unit 13 panorama-synthesizes the image data adjusted in step S12 (step S13).

Next, boundary portion selection unit 14 selects a boundary portion for calculating the image correction value from among the boundary portions of the image data synthesized in step S13 (step S14). For example, boundary portion selection unit 14 selects a boundary portion for calculating the image correction value from among the boundary portions indicated by dotted lines A11 to A13 of FIG. 4A. For example, boundary portion selection unit 14 selects a boundary portion for calculating the image correction value based on the expression (1) described above.

Next, correction value calculator 15 extracts one boundary portion of the image data and determines whether or not the extracted boundary portion is the boundary portion selected in step S14 (step S15). In a case where it is determined that the extracted boundary portion is the boundary portion selected in step S14 ("Yes" in S15), correction value calculator 15 calculates an image correction value of the extracted boundary portion (step S16).

On the other hand, in a case where it is determined that the extracted boundary portion is not the boundary portion selected in step S14 ("No" in S15), correction value calculator 15 sets the correction value calculated in the past as an image correction value of the extracted boundary portion (step S17).

After the processing of step S16 or step S17, correction value calculator determines whether or not all the boundary portions of the panorama-synthesized image data are extracted in step S13 (step S18). For example, correction value calculator 15 determines whether or not all the boundary portions indicated by dotted lines A11 to A13 in FIG. 4A have been sequentially extracted. In a case where it is determined that all the boundary portions have not been extracted ("No" in S18), correction value calculator 15 shifts the processing to step S15.

In a case where the processing is shifted from step S18 to step S15, correction value calculator 15 extracts the next boundary in the processing of step S15. For example, in a case where the boundary portion indicated by dotted line A11 of FIG. 4A is extracted, correction value calculator 15 next extracts the boundary portion indicated by dotted line A12. For example, when the boundary portion indicated by dotted line A12 of FIG. 4A is extracted, correction value calculator 15 next extracts the boundary portion indicated by dotted line A13.

On the other hand, in a case where it is determined that all the boundary portions have been extracted ("Yes" in S18), correction value calculator 15 shifts the processing to step S19. Then, image correction unit 16 performs image correction of the boundary portion (step S19).

In the processing of step S19, image correction unit 16 performs image correction on the boundary portion selected in step S14 using the image correction value calculated in step S16. On the other hand, image correction unit 16 performs image correction on the boundary portion not selected in step S14 using the image correction value calculated in the past from step S17.

Next, image correction unit 16 outputs the image data subjected to image correction in step S19 to output buffer unit 17 (step S20). Then, image correction unit 16 ends the processing of the flowchart.

The image data output to output buffer unit 17 is output to display device 3 and displayed on display device 3.

A hardware configuration example of image processing device 2 will be described.

Figure 7:
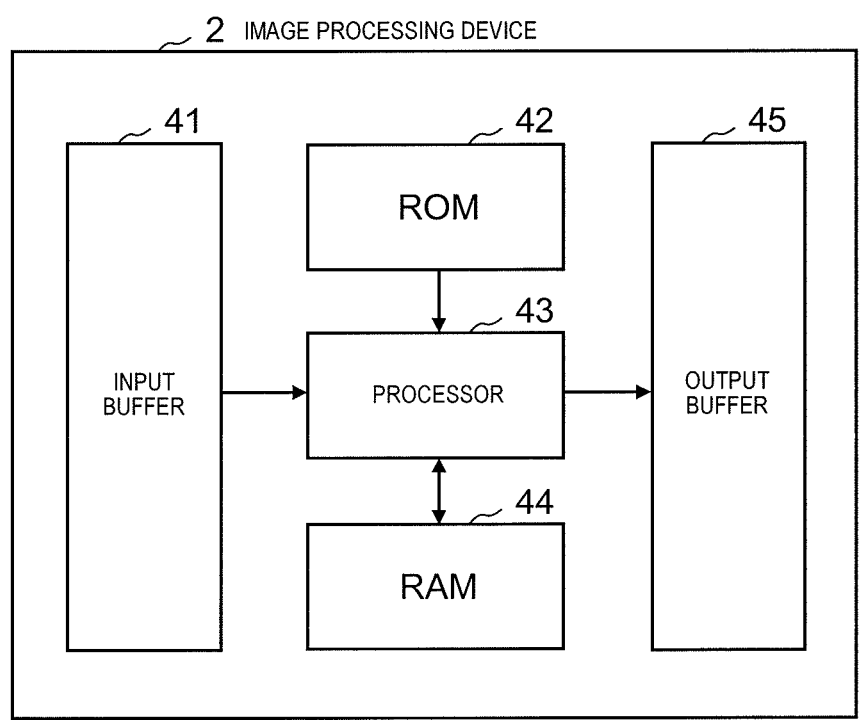
FIG. 7 is a diagram illustrating a hardware configuration example of the image processing device.

FIG. 7 is a diagram illustrating an example of a hardware configuration of image processing device 2. As illustrated in FIG. 7, image processing device 2 includes input buffer 41, read only memory (ROM) 42, processor 43, random access memory (RAM) 44, and output buffer 45.

Input buffer 41 is a storage device that temporarily stores the image data output from photographing cameras 1*a* to 1*d*. Input buffer 41 is configured by of, for example, a RAM.

In ROM 42, programs executed by processor 43 and various data are stored. Processor 43 is, for example, a processor such as a central processing unit (CPU), a graphics processing unit (GPU), or a digital signal processor (DSP). Processor 43 achieves predetermined realization according to the program stored in ROM 42. Various data used by processor 43 is temporarily stored in RAM 44.

Output buffer 45 is a storage device that temporarily stores the image data of the panoramic image generated by processor 43. Output buffer 45 is configured by, for example, a RAM. The image data stored in output buffer 45 is output to display device 3.

The function of input buffer unit 11 illustrated in FIG. 2 is realized by input buffer 41, for example. The functions of adjustment unit 12, synthesizing unit 13, boundary portion selection unit 14, correction value calculator 15, and image correction unit 16 are realized by processor 43, for example. The function of output buffer unit 17 is realized by output buffer 45, for example. Storage unit 18 is realized by ROM 42 or RAM 44.

As described above, boundary portion selection unit 14 selects the boundary portion for calculating the image correction value from among the boundary portions of the adjacent image data. Correction value calculator 15 calculates the image correction value of the boundary portion selected by boundary portion selection unit 14. Image correction unit 16 performs image correction of the boundary portion using the image correction value calculated by correction value calculator 15 in the boundary portion selected by boundary portion selection unit 14 and performs image correction using the image correction value calculated in the past in the boundary portion not selected by boundary portion selection unit 14.

With this configuration, correction value calculator 15 does not need to calculate the image correction value at all of the boundary portions of the adjacent image data, and image processing device 2 can achieve high-speed image processing. Image correction unit 16 performs image correction using the image correction value calculated in the past in the boundary portion where the image correction value has not been calculated, so that image processing device 2 can suppress deterioration of the image quality in the boundary portion where the image correction value has not been calculated.

Real time processing of panoramic images becomes possible by achieving high-speed image processing.

Boundary portion selection unit 14 may store a video image of the selected boundary portion in storage unit 18 when the boundary portion is selected, compare the video images of each boundary portion of the current frame with the video image of the corresponding boundary portion stored in storage unit 18, and select a boundary portion where the video image has changed beyond a predetermined threshold value. Boundary portion selection unit 14 stores (overwrites) the video image of the boundary portion selected in the current frame in storage unit 18.

For example, when description is made using FIG. 4A, storage unit 18 stores video images of the boundary portions indicated by dotted lines A11 to A13 when selected previously by boundary portion selection unit 14. Boundary portion selection unit 14 compares the video image of each of the boundary portions indicated by dotted lines A11 to A13 in the current frame with the video image of each of the boundary portions indicated by dotted lines A11 to A13 at the time of previous selection stored in storage unit 18. Among the video images, for example, it is assumed that only the video image of the boundary portion of the current frame indicated by dotted line A12 exceeds a predetermined threshold value in the change of video image with respect to the video image of the boundary portion indicated by dotted line A12 stored in storage unit 18. In this case, boundary portion selection unit 14 selects the boundary portion indicated by dotted line A12. Boundary portion selection unit 14 stores (overwrites) the video image of the boundary portion indicated by the selected dotted line A12 in storage unit 18. The predetermined threshold value may be selected by the user, or may be dynamically set by automatic video image analysis. This example corresponds to a case where a subject moving or transforming, such as a person, exists in the boundary portion, for example. In such a case, if the past image correction value is applied as it is, there is a high possibility that it cannot follow change of the subject sufficiently and thus, it is possible to reduce discomfort in the synthesized image by exceptionally recalculating the image correction value.

Correction value calculator 15 applies the image correction value calculated in the past as it is in the boundary portion not selected by boundary portion selection unit 14, but is not limited thereto. For example, correction value calculator 15 may predict (calculate) the current image correction value from the image correction values in a plurality of past frames. Then, image correction unit 16 may correct the boundary portion not selected by boundary portion selection unit 14 with the predicted image correction value.

Correction value calculator 15 may estimate (calculate) the current image correction value using past and future image correction values.

FIG. 8 is a diagram for explaining an example of estimating an image correction value using past and future image correction values. "Input" illustrated in FIG. 8 indicates image data of one boundary portion of interest (for example, the boundary portion indicated by dotted line A11 in FIG. 4A) among the boundary portions of the image data synthesized by synthesizing unit 13.

"Output" illustrated in FIG. 8 indicates the image correction value in the boundary portion of interest. The arrow illustrated in FIG. 8 indicates the time axis. The numbers of "input" and "output" indicate frame numbers. The diagonal lines of "input" illustrated in FIG. 8 indicate that the boundary portions of interest have been selected by boundary portion selection unit 14.

First, when the image data of the boundary portion of interest in "frame 1" is input, the boundary portions of interest is selected by boundary portion selection unit 14 and thus, correction value calculator 15 calculates the image correction value of the boundary portion of interest in "frame 1". Correction value calculator 15 stores the image correction value of the boundary portion of interest in the calculated "frame 1" in storage unit 18.

Next, when the image data of the same boundary portion of interest in "frame 2" is input, the boundary portion of interest is not selected by boundary portion selection unit 14 and thus, correction value calculator 15 does not calculate the correction value of the boundary portion of interest in "frame 2". Correction value calculator 15 outputs the image correction value of the boundary portion of interest in "frame 1" stored in storage unit 18.

Next, when the image data of the same boundary portion of interest in "frame 3" is input, the boundary portion of interest is selected by boundary portion selection unit 14 and thus, correction value calculator 15 calculates a correction value of the boundary portion of interest in "frame 3". Correction value calculator 15 stores the calculated image correction value of the boundary portion of interest in "frame 3" in storage unit 18. Correction value calculator 15 calculates the correction value of the boundary portion of interest in "frame 2" using the image correction value of the boundary portion of interest in "frame 1" stored in storage unit 18 and the image correction value of the boundary portion of interest in "frame 3" and outputs the correction value of the boundary portion of interest in "frame 2". For example, correction value calculator 15 outputs, an average value of the image correction value of the boundary portion of interest in "frame 1" stored in storage unit 18 and the image correction value of the boundary portion of interest in "frame 3" stored in storage unit 18, as the correction value of the boundary portion of interest in "frame 2".

Next, when the image data of the same boundary portion of interest in "frame 4" is input, the boundary portion of interest is not selected by boundary portion selection unit 14 and thus, correction value calculator 15 does not calculate the correction value of the boundary portion of interest in "frame 4". Correction value calculator 15 outputs the image correction value of the boundary portion of interest in "frame 3" stored in storage unit 18.

Next, when the image data of the same boundary portion of interest in "frame 5" is input, the boundary portion of interest is selected by boundary portion selection unit 14 and thus, correction value calculator 15 calculates a correction value of the boundary portion of interest in "frame 5". Correction value calculator 15 stores the calculated image correction value of the boundary portion of interest in "frame 5" in storage unit 18. Correction value calculator 15 calculates the correction value of the boundary portion of interest in "frame 4" using the image correction value of the boundary portion of interest in "frame 3" stored in storage unit 18 and the image correction value of the boundary portion of interest in "frame 5" and outputs the correction value of the boundary portion of interest in "frame 4". For example, correction value calculator 15 outputs, an average value of the image correction value of the boundary portion of interest in "frame 3" stored in storage unit 18 and the image correction value of the boundary portion of interest in "frame 5" stored in storage unit 18, as the correction value of the boundary portion of interest in "frame 4".

Correction value calculator 15 continues to apply the same processing to all the boundary portions in the following. When the image correction values of all the boundary portions in a certain frame are calculated, image correction unit 16 performs image correction of the image data of the frame and outputs the corrected image data to output buffer unit 17.

With the processing described as above, image processing device 2 can correct image data based on past and future image correction values. With this configuration, it is possible to perform correction with less sense of incompatibility between frames for the boundary portion. However, when performing the implementation described above, the output image data is delayed by one or several frames with respect to the input image data. In the example described above, correction value calculator 15 outputs the average value of past and future image correction values, but is not limited to the average value. An average value obtained by performing different weighting between the past and the future may be output or a value derived by a calculation process different from an average value such as a median may be used.

In a case where future image data is stored in advance, correction value calculator 15 can pre-read image data of a future frame in advance to calculate a future image correction value in advance. In this case, image processing device 2 can perform image correction based on past and future image correction values even without delay of the image data to be output.

Although the embodiment of the present disclosure has been described as above, the following modification example is also conceivable.

Image correction unit 16 may correct the boundary portion not selected by boundary portion selection unit 14 using a correction value not related to past image correction values. For example, it is conceivable to apply a correction value determined in advance.

In the embodiment described above, it is assumed that a panoramic video image is generated, but is not limited thereto. For example, even in the case of generating an all-round video image, the boundary portion can be corrected by the same processing. If the number of images to be synthesized is m, in a case of generating a panoramic video image, the number of boundary portions is m−1, whereas in a case of generating the all-round video image, the number of boundary portions is m.

In the embodiment described above, images captured from a plurality of imaging devices are synthesized, but is not limited thereto. A plurality of adjacent captured images may be acquired from one imaging device, or images recorded in advance in adjacent areas may be synthesized. That is, any kind of image data may be used as long as it is a plurality of mutually adjacent and partially overlapping pieces of image data.

In the embodiment described above, boundary portion selection unit 14 selects a smaller number of boundary portions than all the boundary portions in all the frames, but is not limited thereto. For example, boundary portion selection unit 14 may select all the boundary portions in a certain frame and select only a part of boundary portions in another frame. Also in this case, image processing device 2 can reduce a processing load as compared with the case where the image correction values of all the boundary portions are calculated in all the frames. Also in this modification example, it is possible to calculate the image correction value for an unselected boundary portion based on past and future image correction values. For example, in a case of selecting all of the boundary portions in the first frame, not selecting a part or all of the boundary portions in the second frame subsequent to the first frame, and selecting all of the boundary portions in the third frame subsequent to the second frame, it is conceivable to use an image correction value of the boundary portion not selected in the second frame as an average value of the image correction values in the first frame and the third frame. Also in this case, it is not always necessary to use the average value of the past (the first frame) image correction value and the future (the third frame) image correction value, and a value derived by another calculation process may be used.

Respective functional blocks used in description of the embodiment described above are typically realized as an LSI which is an integrated circuit. These may be separately formed into one chip, or may be formed into one chip so as to include some or all of the functional blocks. Here, although it is LSI, it may be called IC, system LSI, super LSI, ultra LSI depending on the degree of integration.

A method of forming an integrated circuit is not limited to LSI, and may be realized by a dedicated circuit or a general-purpose processor. After LSI fabrication, a field programmable gate array (FPGA) that can be programmed and a reconfigurable processor in which connection and setting of circuit cells inside the LSI can be reconfigured may be used.

Furthermore, if an integrated circuit technology that replaces LSI appears due to advances in semiconductor technology or other derivative technologies, of course, integration of functional blocks may be performed using that technology. Application of biotechnology or the like may be possible.

INDUSTRIAL APPLICABILITY

The image processing device and the image processing method according to the present disclosure can be applied to synthesis of a plurality of image data photographed by a plurality of photographing devices.

REFERENCE MARKS IN THE DRAWINGS 1a to 1d PHOTOGRAPHING CAMERA
2 IMAGE PROCESSING DEVICE
3 DISPLAY DEVICE
11 INPUT BUFFER UNIT
12 ADJUSTMENT UNIT
13 SYNTHESIZING UNIT
14 BOUNDARY PORTION SELECTION UNIT
15 CORRECTION VALUE CALCULATOR
16 IMAGE CORRECTION UNIT
17 OUTPUT BUFFER UNIT
18 STORAGE UNIT

The invention claimed is:

1. An image processing device for synthesizing a plurality of mutually adjacent and partially overlapping pieces of image data, the device comprising:
 a boundary portion selection circuit which, from a plurality of boundary portions of a plurality of mutually adjacent and partially overlapping pieces of image data, selects a boundary portion for calculating an image correction value;
 a correction value calculator which calculates the image correction value of the boundary portion selected by the boundary portion selection circuit;
 an image correction circuit which, in the boundary portion selected by the boundary portion selection circuit, performs image correction of the boundary portion using the image correction value calculated by the correction value calculator, and which, in a boundary portion that has not been selected by the boundary portion selection circuit, performs image correction using a previously stored image correction value; and
 a synthesizing circuit that synthesizes the plurality of mutually adjacent and partially overlapping pieces of image data,
 wherein the image correction value is not calculated for the boundary portion among the plurality of boundary portions that is not selected by the boundary portion selection circuit.

2. The image processing device of claim 1,
 wherein the image correction circuit performs image correction using the previously stored image correction value and a future image correction value in the boundary portion that has not been selected by the boundary portion selection circuit.

3. The image processing device of claim 1,
 wherein the boundary portion selection circuit changes the boundary portion to be selected for each frame.

4. The image processing device of claim 3,
 wherein the boundary portion selection circuit selects all of the boundary portions in a first frame, does not select at least one boundary portion in a second frame subsequent to the first frame, and selects all of the boundary portions in a third frame subsequent to the second frame.

5. The image processing device of claim 4,
 wherein the image correction circuit corrects an image of the second frame using an image correction value of the first frame and an image correction value of the third frame.

6. The image processing device of claim 3,
 wherein the boundary portion selection circuit selects a larger number of boundary portions as processing capability of the image correction circuit is higher.

7. The image processing device of claim 3,
 wherein the boundary portion selection circuit selects a larger number of boundary portions as processing capability of the image correction circuit has more margin.

8. The image processing device of claim 1,
 wherein the boundary portion selection circuit selects the boundary portion in which a change in a video image between frames exceeds a predetermined threshold value.

9. An image processing method of an image processing device for synthesizing a plurality of mutually adjacent and partially overlapping pieces of image data, the method comprising:
 selecting a boundary portion for calculating an image correction value from a plurality of boundary portions of a plurality of mutually adjacent and partially overlapping pieces of image data;
 calculating an image correction value of the boundary portion selected;
 performing image correction of the boundary portion using the image correction value calculated in the boundary portion selected;
 performing image correction using a previously stored image correction value in a boundary portion that has not been selected in the selecting; and
 synthesizing the plurality of mutually adjacent and partially overlapping pieces of image data,
 wherein the image correction value is not calculated for the boundary portion among the plurality of boundary portions that is not selected.

10. The image processing device of claim 1,
 wherein the image correction value is calculated only for the selected boundary portion that is less than all of the plurality of boundary portions.

11. The image processing device of claim 1,
 wherein the boundary portion selection circuit selects less than all of the plurality of boundary portions, such that at least one boundary portion among the plurality of boundary portions is not selected for calculating the image correction value.

* * * * *